(12) United States Patent
Loehr et al.

(10) Patent No.: US 11,871,392 B2
(45) Date of Patent: *Jan. 9, 2024

(54) DETERMINING A PRIORITY ORDER BASED ON UPLINK TRANSMISSION PARAMETERS

(71) Applicant: Motorola Mobility LLC, Chicago, IL (US)

(72) Inventors: Joachim Loehr, Wiesbaden (DE); Prateek Basu Mallick, Dreieich (DE); Ravi Kuchibhotla, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,869

(22) Filed: Jul. 11, 2022

(65) Prior Publication Data
US 2022/0346098 A1 Oct. 27, 2022

Related U.S. Application Data

(63) Continuation of application No. 16/945,647, filed on Jul. 31, 2020, now Pat. No. 11,388,718, which is a (Continued)

(51) Int. Cl.
*H04W 72/0453* (2023.01)
*H04W 72/0446* (2023.01)
(Continued)

(52) U.S. Cl.
CPC ....... *H04W 72/0453* (2013.01); *H04L 5/0007* (2013.01); *H04W 72/0446* (2013.01);
(Continued)

(58) Field of Classification Search
CPC ............. H04W 72/0453; H04W 72/56; H04W 72/569; H04W 72/563; H04W 72/23;
(Continued)

(56) References Cited

U.S. PATENT DOCUMENTS 9,756,523 B2 9/2017 Zhang et al.
9,839,043 B2 12/2017 Yi et al.
(Continued)

OTHER PUBLICATIONS

Huawei, HiSilicon, "LCP with Multiple Numerologies", 3GPP TSG-WG2 #97, R2-1701203, Feb. 13-17, pp. 1-2.
(Continued)

*Primary Examiner* — Chandrahas B Patel
(74) *Attorney, Agent, or Firm* — Kunzler Bean & Adamson

(57) ABSTRACT

Apparatuses, methods, and systems are disclosed for determining a priority order based on uplink transmission parameters. One apparatus includes a processor that: indicates uplink transmission parameters to a medium access control layer, wherein the uplink transmission parameters correspond to an uplink grant, the uplink transmission parameters comprise an indication of a numerology and an uplink transmission duration, and the numerology comprises a subcarrier spacing; and assigns, by the medium access control layer, resources allocated by the uplink grant to the logical channels based on the uplink transmission parameters and a logical channel priority of the plurality of logical channels, wherein each logical channel of the plurality of logical channels is configured with a set of numerologies allowed by the respective logical channel, a maximum uplink transmission duration, and information indicating whether a data of the respective logical channel is allowed to be transmitted on a configured grant.

20 Claims, 9 Drawing Sheets

Related U.S. Application Data continuation of application No. 16/414,616, filed on May 16, 2019, now Pat. No. 10,736,107, which is a continuation of application No. 15/496,960, filed on Apr. 25, 2017, now Pat. No. 10,334,598.

(51) Int. Cl.
| | | |
|---|---|---|
| *H04W 72/1273* | (2023.01) | |
| *H04L 5/00* | (2006.01) | |
| *H04W 72/23* | (2023.01) | |
| *H04W 72/56* | (2023.01) | |
| *H04W 72/563* | (2023.01) | |
| *H04W 72/566* | (2023.01) | |

(52) U.S. Cl.
CPC ....... *H04W 72/1273* (2013.01); *H04W 72/23* (2023.01); *H04W 72/56* (2023.01); *H04W 72/563* (2023.01); *H04W 72/569* (2023.01); *H04L 5/0053* (2013.01)

(58) Field of Classification Search
CPC .......... H04W 72/0446; H04W 72/1273; H04L 5/0007; H04L 5/0053
See application file for complete search history.

(56) References Cited

U.S. PATENT DOCUMENTS

| | | | |
|---|---|---|---|
| 10,200,170 | B2 | 2/2019 | Guo et al. |
| 10,225,065 | B2 | 3/2019 | Ang et al. |
| 10,225,867 | B2 | 3/2019 | Nagaraja et al. |
| 10,251,172 | B2 | 4/2019 | Abedini et al. |
| 10,841,948 | B2 * | 11/2020 | Zhang ................... H04L 5/0053 |
| 11,197,313 | B2 * | 12/2021 | Lee ...................... H04W 72/569 |
| 2018/0310308 | A1 | 10/2018 | Loehr et al. |
| 2019/0380153 | A1 * | 12/2019 | Damnjanovic ....... H04L 5/0094 |

OTHER PUBLICATIONS

Lenovo, Motorola Mobility, "LCP procedure with multiple numerologies", 3GPP TSG-RAN WG2 Meeting NR#2, R2-1706883, Jun. 27-29, 2017, pp. 1-2.

Lenovo, Motorola Mobility, "LCP procedure with multiple numerologies", 3GPP TSG-RAN WG2 Meeting #97bis, R2-1703153, Apr. 3-7, 2017, p. 1.

Lenovo, Motorola Mobility, "LCP procedure for NR", 3GPP TSG-RAN WG2 Meeting #100, R2-1712912, Nov. 27-Dec. 1, 2017, pp. 1-3.

* cited by examiner

DETERMINING A PRIORITY ORDER BASED ON UPLINK TRANSMISSION PARAMETERS

CROSS REFERENCE TO RELATED APPLICATIONS

This application is a continuation of application Ser. No. 16/945,647 filed on Jul. 31, 2020, which is a continuation of application Ser. No. 16/414,616 filed on May 16, 2019, which is a continuation of application Ser. No. 15/496,960 filed on Apr. 25, 2017, now U.S. Pat. No. 10,334,598, issued on Jun. 25, 2019, which are hereby incorporated by reference in their entirety.

FIELD

The subject matter disclosed herein relates generally to wireless communications and more particularly relates to determining a priority order based on uplink transmission parameters.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a high carrier frequency (e.g., >6 GHz) may be used, such as millimeter wave. In various configurations, to support various requirements of different services (e.g., eMBB, URLLC, mMTC), different OFDM numerologies may be used (e.g., sub-carrier spacing ("SCS"), CP length) in a single framework. Certain configurations have diverse requirements in terms of data rates, latency, and coverage. For example, eMBB may support peak data rates (e.g., 20 Gbps for downlink and 10 Gbps for uplink) and user-experienced data rates in the order of three times what is found in other configurations. On the other hand, URLLC may have certain requirements for ultra-low latency (e.g., 0.5 ms for each of UL and DL for user plane latency) and high reliability (e.g., $1 \times 10^{-5}$ within 1 ms). Moreover, mMTC may have a high connection density, a large coverage in harsh environments, and extremely long-life battery for low cost devices. Therefore, an OFDM numerology (e.g., subcarrier spacing, OFDM symbol duration, CP duration, number of symbols per scheduling interval, etc.) that is suitable for one configuration might not work well for another. For example, low-latency services may use a shorter symbol duration (and thus larger subcarrier spacing) and/or fewer symbols per scheduling interval (e.g., TTI) than an mMTC configuration. Furthermore, deployment configurations with large channel delay spreads may use a longer CP duration than configurations with short delay spreads. The subcarrier spacing may be optimized in various configurations to retain a similar CP overhead.

In certain configurations, a UE may be configured with multiple numerologies simultaneously. A logical channel prioritization ("LCP") procedure may not facilitate the use of multiple numerologies simultaneously. In various configurations, the LCP procedure may be performed as defined in TS36.321 section 5.4.3.1 which is incorporated herein by reference in its entirety. In some configurations, logical channels are each assigned a priority (e.g., logical channel priority). Furthermore, a prioritized bit rate ("PBR") may be defined for each logical channel. In certain configurations, the PBR provides support for each logical channel, including low priority non-guaranteed bit rate ("GBR") bearers, to have a minimum bit rate to avoid a potential starvation. Each bearer may get enough resources to achieve the PRB. In various configurations, the LCP procedure may be a two-step procedure. In the first step the logical channels may be served (in decreasing priority order starting with the highest priority logical channel) up to their configured PBR (implemented by means of a token bucket model). In the second step of the LCP procedure if any uplink resources remain (after meeting the PBR of the LCHs in the first step), all the logical channels are served in a strict decreasing priority order (regardless of the value of bucket) until either the data for that logical channel or the UL grant is exhausted.

Because the LCP procedure doesn't consider different numerologies and/or TTI lengths allowed (it only considers the logical channel priority/PBR of a logical channel), configurations may not meet respective transmission requirements.

BRIEF SUMMARY

Apparatuses for determining a priority order based on uplink transmission parameters are disclosed. Methods and systems also perform the functions of the apparatus. In one embodiment, the apparatus includes a receiver that receives an uplink grant corresponding to uplink transmission parameters that include an indication of a numerology and a transmission time interval length. In various embodiments, the apparatus includes a processor that determines a priority order of multiple logical channels based on the uplink transmission parameters and a logical channel priority of the multiple logical channels. In certain embodiments, the processor assigns resources to logical channels of the multiple logical channels based on the priority order.

In one embodiment, the numerology includes a subcarrier spacing, an orthogonal frequency-division multiplexing symbol duration, a cyclic prefix duration, or some combination thereof. In a further embodiment, the processor determines the priority order of the multiple logical channels based on the uplink transmission parameters and the logical channel priority of the multiple logical channels by: selecting a set of logical channels of the multiple logical channels in response to a numerology parameter of each logical channel of the set of logical channels including the numerology and a maximum transmission time interval length of each logical channel of the set of logical channels being less than or equal to the transmission time interval length; and ordering the logical channels of the set of logical channels according to a logical channel priority of each logical channel of the set of logical channels. In certain embodiments, ordering the logical channels of the set of logical channels includes ordering the logical channels of the set of logical channels in descending priority order. In various embodiments, the numerology parameter includes one or more numerologies. In some embodiments, logical channels of the set of logical channels are prioritized over a medium access control control element.

In some embodiments, the indication of the numerology includes an index corresponding to the numerology. In one embodiment, each logical channel of the multiple logical channels is configured with a set of numerologies allowed by the respective logical channel and a maximum transmission time interval length.

In certain embodiments, each logical channel of the multiple logical channels is configured with a maximum numerology allowed by the respective logical channel and a maximum transmission time interval length. In various embodiments, the processor determines the priority order of the multiple logical channels based on the uplink transmission parameters and the logical channel priority of the multiple logical channels by: selecting a set of logical channels of the multiple logical channels in response to a maximum numerology of each logical channel of the set of logical channels being less or equal to the numerology and a maximum transmission time interval length of each logical channel of the set of logical channels being less than or equal to the transmission time interval length; and ordering the logical channels of the set of logical channels according to a logical channel priority of each logical channel of the set of logical channels. In some embodiments, the processor selects a scheduling request resource for transmission, and the scheduling request resource corresponds to a numerology being requested for uplink transmission.

In one embodiment, the processor selects the scheduling request resource according to a first numerology of a set of configured numerologies of a logical channel of the multiple logical channels for which a buffer status report is triggered due to data becoming available for transmission. In certain embodiments, the receiver receives multiple uplink grants and determines an order for processing the multiple uplink grants based on a number of logical channels of the multiple logical channels configured with a numerology corresponding to a respective uplink grant of the multiple uplink grants. In various embodiments, the receiver receives multiple uplink grants and determines an order for processing the multiple uplink grants based on a predefined numerology priority order. In one embodiment, the receiver receives multiple uplink grants and determines an order for processing the multiple uplink grants based on a predefined order, a signaled order, or some combination thereof.

A method for determining a priority order based on uplink transmission parameters, in one embodiment, includes receiving an uplink grant corresponding uplink transmission parameters including an indication of a numerology and a transmission time interval length. In various embodiments, the method includes determining a priority order of multiple logical channels based on the uplink transmission parameters and a logical channel priority of the multiple logical channels. In certain embodiments, the method includes assigning resources to logical channels of the multiple logical channels based on the priority order.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
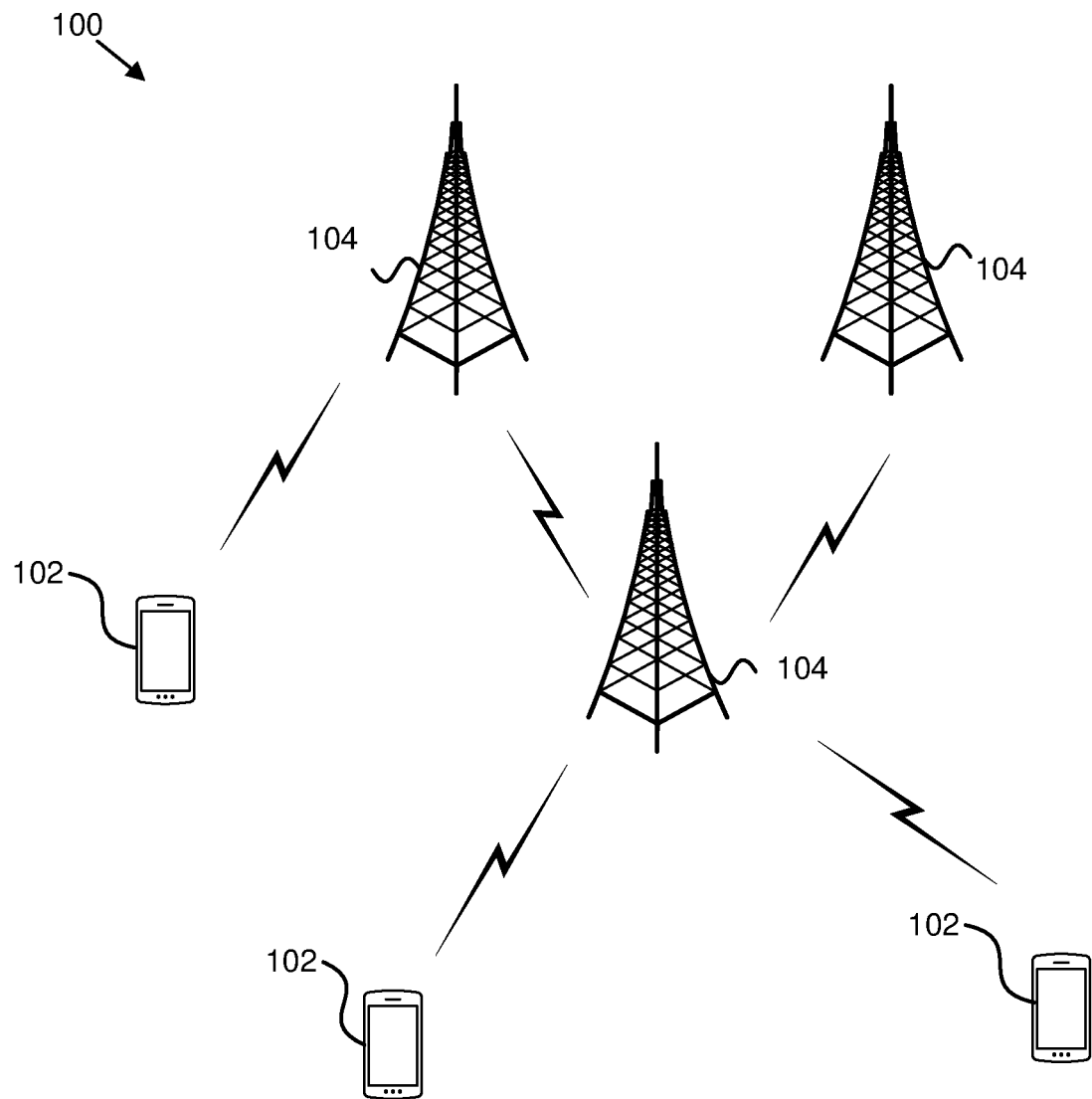
FIG. 1 is a schematic block diagram illustrating one embodiment of a wireless communication system for determining a priority order based on uplink transmission parameters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a priority order based on uplink transmission parameters. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. In one embodiment, a base unit 104 may transmit an uplink grant corresponding to uplink transmission parameters to the remote unit 102.

In another embodiment, a remote unit 102 may receive an uplink grant corresponding to uplink transmission parameters including an indication of a numerology and a transmission time interval length. The remote unit 102 may determine a priority order of multiple logical channels based on the uplink transmission parameters and a logical channel priority of the multiple logical channels. In certain embodiments, the remote unit 102 may assign resources to logical channels of the multiple logical channels based on the priority order. Accordingly, a remote unit 102 may be used for determining a priority order based on uplink transmission parameters.

Figure 2:
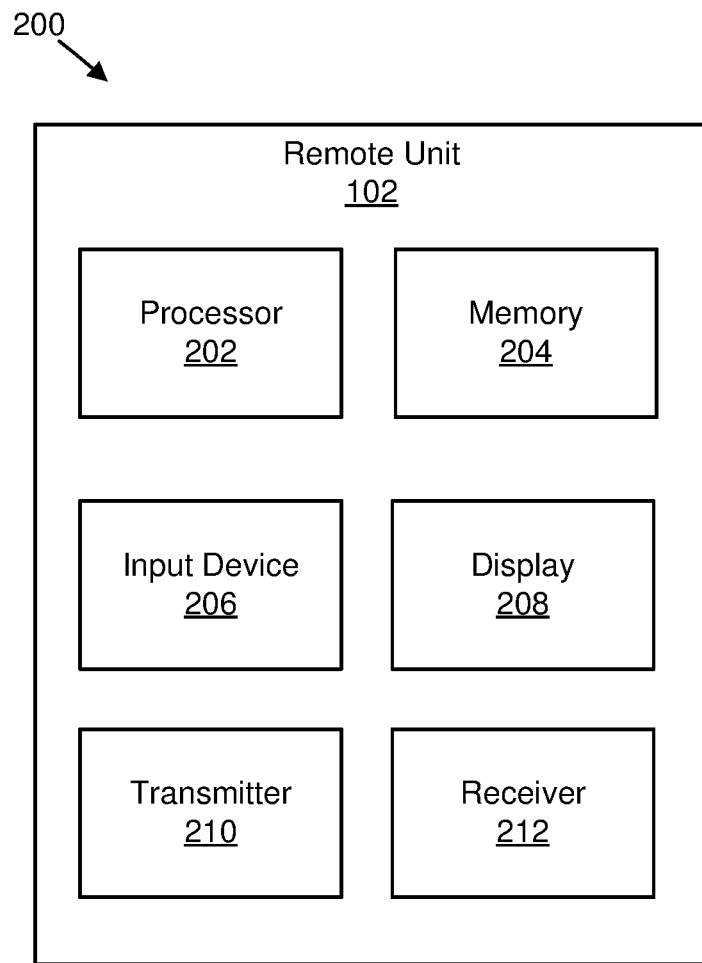
FIG. 2 is a schematic block diagram illustrating one embodiment of an apparatus that may be used for determining a priority order based on uplink transmission parameters.

FIG. 2 depicts one embodiment of an apparatus 200 that may be used for determining a priority order based on uplink transmission parameters. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 determines a priority order of multiple logical channels based on uplink transmission parameters and a logical channel priority of the multiple logical channels. In certain embodiments, the processor 202 assigns resources to logical channels of the multiple logical channels based on the priority order. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to a priority order. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 receives an uplink grant corresponding to uplink transmission parameters including an indication of a numerology and a transmission time interval length. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
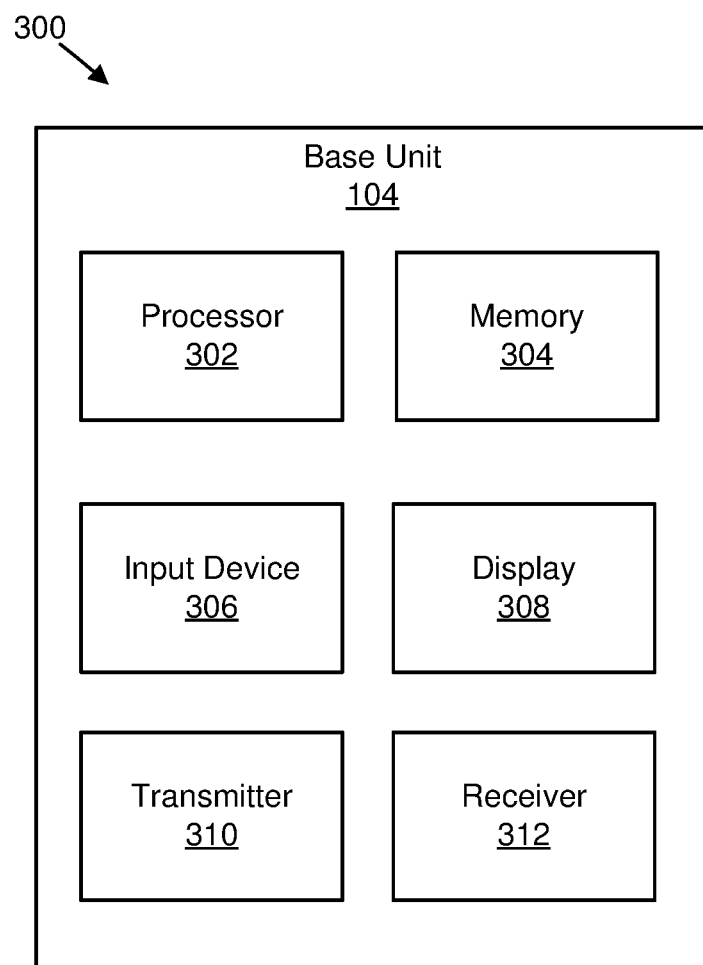
FIG. 3 is a schematic block diagram illustrating one embodiment of an apparatus that may be used for transmitting uplink transmission parameters.

FIG. 3 depicts one embodiment of an apparatus 300 that may be used for transmitting uplink transmission parameters. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit an uplink grant corresponding to uplink transmission parameters including an indication of a numerology and a transmission time interval length. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
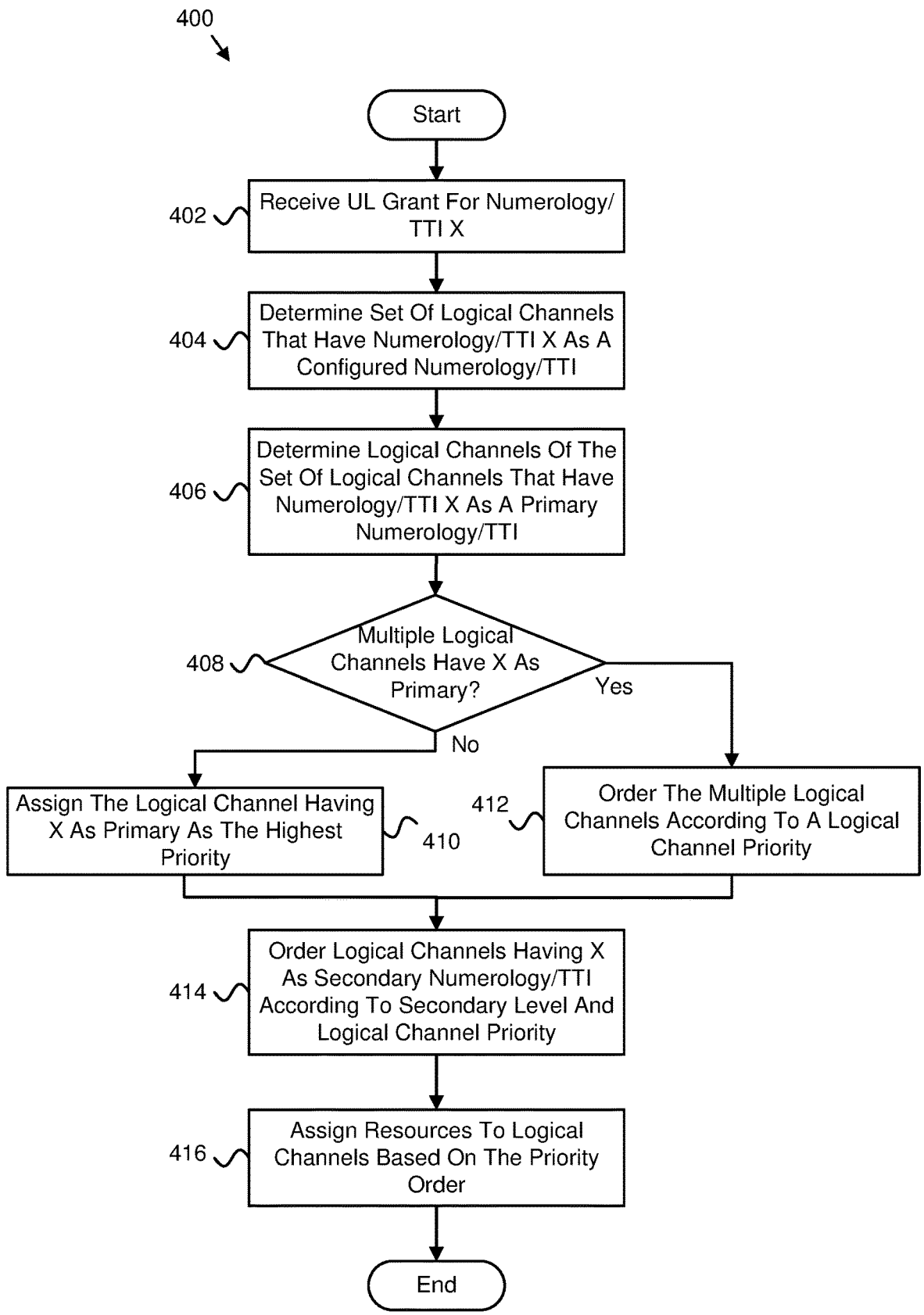
FIG. 4 is a schematic flow chart diagram illustrating one embodiment of a method for determining a priority order based on an uplink transmission parameter.

FIG. 4 is a schematic flow chart diagram illustrating one embodiment of a method 400 for determining a priority order based on an uplink transmission parameter. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In certain embodiments, in addition to a logical channel priority, each numerology (e.g., subcarrier spacing, OFDM symbol duration, CP duration, number of symbols per scheduling interval, etc.) and/or TTI that is configured for a logical channel as an allowed numerology and/or TTI may be associated with a priority. During an LCP procedure a UE and/or MAC may consider both the numerology priority as well as the logical channel priority in order to determine the order in which logical channels are served. In some embodiments, a logical channel is configured to use multiple numerologies and/or TTI(s) for transmission, the configured allowed numerologies have a certain priority order which a UE may respect during the LCP procedure. Specifically, a logical channel may include a preferred/primary numerology/TTI (e.g., uplink transmission parameter) and a secondary numerology/TTI (e.g., uplink transmission parameter). In various embodiments, there is one preferred/primary numerology/TTI associated with each logical channel. The preferred/primary numerology/TTI may be the numerology best suited for transmission of data of a particular logical channel according to service/QoS requirements. In certain embodiments, there may be one or more secondary numerologies/TTI associated with each logical channel.

In some embodiments, the preferred/primary numerology/TTI may have the highest priority among the allowed numerologies. In various embodiments, the priority of the secondary numerologies may be in the order of configuration (e.g., first configured secondary numerology has a second highest priority, second configured secondary numerology has a third highest priority, and so forth). In certain embodiments, the priority of the numerologies associated with a logical channel may be respected by the UE during an LCP procedure (e.g., logical channels that have an indicated numerology in an UL grant configured as the preferred/primary numerology may be prioritized over logical channels which have the indicated numerology only configured as a secondary numerology/TTI). Accordingly, data of logical channels may be transmitted with the best suited numerology scheme to facilitate complying with requirements of a numerology configuration.

Turning to the method 400, the method 400 includes receiving 402 an UL grant for a numerology/TTI X. The method 400 also includes determining 404 a set of logical channels having data available for transmission that have numerology/TTI X as a configured numerology/TTI. The method 400 further determines a priority order among the logical channels of above determined set of logical channels based on a numerology/TTI priority and a logical channel priority. Specifically, the method 400 includes determining 406 logical channels of the set of logical channels that have numerology/TTI X as a preferred/primary numerology/TTI. The method 400 determines 408 whether there are multiple logical channels that have numerology/TTI X as the preferred/primary numerology/TTI. In response to determining 408 that there is only one logical channel having numerology/TTI X as the preferred/primary numerology/TTI, the method 400 assigns 410 the one logical channel having numerology/TTI X as the preferred/primary numerology/TTI as the highest priority. In response to determining 408 that there are multiple logical channels having numerology/TTI X as the preferred/primary numerology/TTI, the method 400 orders 412 the multiple logical channels according to a configured logical channel priority (e.g., in decreasing priority order). Furthermore, the method 400 orders 414 logical channels having numerology/TTI X as a secondary numerology/TTI according to a secondary level and the logical channel priority. For example, the method 400 orders 414 the logical channels having X as a secondary numerology/TTI by setting logical channels having the indicated numerology/TTI X as a first secondary numerology/TTI to a higher priority than logical channels having the indicated numerology/TTI X as a second secondary numerology/TTI, and so forth. Then, for logical channels having multiple first or second secondary numerologies that have the indicated numerology/TTI X, the channels are ordered in priority based on the logical channel priority. The method 400 assigns 416 resources to individual logical channels which are part of the set of logical channels considering the computed priority order of the logical channels using the LCP procedure.

The following is one example of the above method 400. In this example, a UE has three logical channels LCH #1, LCH #2, and LCH #3 as illustrated in Table 1. LCH #1 has numerology 1 as its primary numerology and numerology 3 as its first secondary numerology. Moreover, LCH #2 has numerology 2 as its primary numerology, numerology 1 as its first secondary numerology, and numerology 3 as its second secondary numerology. Further, LCH #3 has numerology 3 as its primary numerology and numerology 1 as its first secondary numerology. As shown, LCH #2 has the highest priority with a logical channel priority of 1, LCH #1 has the second highest priority with a logical channel priority of 2, and LCH #3 has the third highest priority (e.g., lowest priority) with a logical channel priority of 3. In an embodiment in which a UL grant is received for numerology 1, data of LCH #1 may be prioritized over data of LCH #2 and LCH #3 regardless of the configured logical channel priority because numerology 1 is only a primary numerology for LCH #1.

TABLE 1

| LCH #1 (Priority 2) | LCH #2 (Priority 1) | LCH #3 (Priority 3) |
| --- | --- | --- |
| Primary Numerology = 1 | Primary Numerology = 2 | Primary Numerology = 3 |
| Secondary Numerology = 3 | Secondary Numerology = 1 | Secondary Numerology = 1 |
| | Secondary Numerology = 3 | |

Using the information from Table 1 for another example, for an UL grant for numerology 1, the logical channel priority order is: LCH #1, LCH #2, LCH #3. This is because LCH #1 is the only logical channel with numerology 1 as the primary numerology, and while LCH #2 and LCH #3 both have numerology 1 as the first secondary numerology, LCH #2 has a higher priority (e.g., 1) than LCH #3 (e.g., 3). As a further example, for an UL grant for numerology 3, the logical channel priority order is: LCH #3, LCH #1, LCH #2. This is because LCH #3 is the only logical channel with numerology 3 as the primary numerology, LCH #1 is the only logical channel with numerology 3 as the first secondary numerology, and LCH #2 is the only logical channel with numerology 3 as the second secondary numerology.

Figure 5:
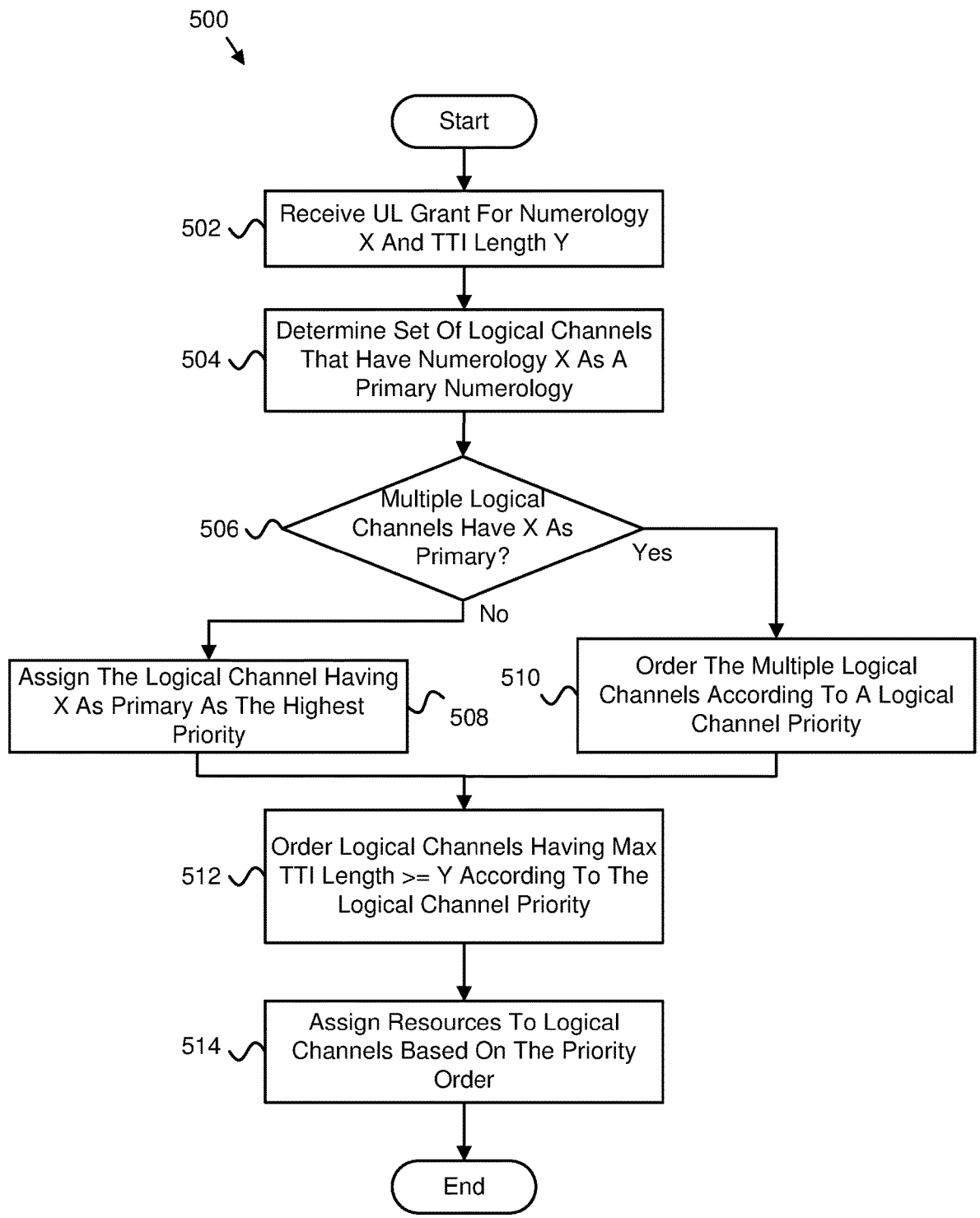
FIG. 5 is a schematic flow chart diagram illustrating another embodiment of a method for determining a priority order based on an uplink transmission parameter.

FIG. 5 is a schematic flow chart diagram illustrating another embodiment of a method 500 for determining a priority order based on an uplink transmission parameter. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In one embodiment, the network (e.g. gNB) configures a preferred/primary numerology and a maximum TTI length for each logical channel. The primary/preferred numerology is the numerology best suited for transmission of data of the logical channel in order to meet the QoS requirement (e.g., latency and reliability). The maximum TTI length value allows a logical channel to use all the TTI lengths (regardless of the numerology) unless the TTI length cannot meet the delay requirement of the logical channel. Therefore, data of a logical channel may be transmitted using any numerology as long as the TTI length is equal to or smaller than the configured maximum TTI length. It should be noted that TTI length, which is the schedulable unit of time from MAC point of view, depends not only on the used numerology (e.g., subcarrier spacing "SCS"), but also on the number of used OFDM symbols. In some embodiments, a TTI length may be reduced by keeping the same numerology (or SCS), but reducing the number of OFDM symbols per TTI (e.g., using only two symbols per TTI), or by keeping the same number of OFDM symbols but scaling the SCS (e.g., reducing the symbol length).

In certain embodiments, reducing the OFDM symbol length by SCS scaling may have certain benefits over reducing the number of OFDM symbols (e.g., for the same SCS). For example, the smaller symbol length by SCS scaling may become a useful tool to enable fast pipeline processing of both UL and DL channels (e.g., short TTI length by scaling SCS (i.e., scaling down the symbol duration) further tightens processing timeline and HARQ RTT).

Therefore, in some embodiments, the MAC layer is aware of the numerology used for an uplink transmission and the TTI length. Based on the numerology and TTI length, as indicated by the physical layer ("PHY") to the MAC upon reception of an uplink grant, the logical channel to resource mapping (e.g., LCP procedure) is performed. The MAC entity prioritizes those logical channels for which the configured preferred/primarily numerology is the same as the indicated numerology for the uplink transmission. This prioritization ensures that the data of those logical channels is always transmitted with the best suited numerology configuration to facilitate complying with the requirements for which the numerology configuration was configured. If there are remaining resources available, logical channels for which the configured maximum TTI length is equal or larger than the indicated TTI length are considered for transmission.

Turning to the method 500, the method 500 includes receiving 502 an UL grant for a numerology X and a TTI length Y, i.e., uplink transmission according to received uplink grant uses numerology X and TTI length Y. The method 500 also includes determining 504 a set of logical channels that have numerology X as a preferred/primary numerology. The method 500 further determines a priority order among the logical channels of above determined set of logical channels based on a logical channel priority. Specifically, the method 500 determines 506 whether there are multiple logical channels that have numerology X as the preferred/primary numerology. In response to determining 506 that there is only one logical channel having numerology X as the preferred/primary numerology, the method 500 assigns 508 the one logical channel having numerology X as the preferred/primary numerology as the highest priority. In response to determining 506 that there are multiple logical channels having numerology X as the preferred/primary numerology, the method 500 orders 510 the multiple logical channels according to a configured logical channel priority (e.g., in decreasing priority order). Furthermore, the method 500 orders 512 logical channels having a maximum TTI length greater than or equal to Y according to the logical channel priority (if there are resources remaining). The method 500 assigns 514 resources to individual logical channels based on the computed priority order of the logical channels using the LCP procedure. In certain embodiments, the LCP procedure is performed as defined in TS36.321 section 5.4.3.1 (e.g., using token bucket, using a two-step procedure, etc.). In various embodiments, the method 500 first assigns resources to the logical channels that have numerology X as the preferred/primary numerology based on the computed priority order 508 respectively 510 using the LCP procedure and subsequently assigns remaining resources (if any) to logical channels having a maximum TTI length greater than or equal to Y based on the computed priority order 512.

The following is one example of the above method 500. In this example, a UE has four logical channels LCH #1, LCH #2, LCH #3, and LCH #4 as illustrated in Table 2. LCH #1 has numerology 1 as its primary numerology and 1 ms as its maximum TTI. Moreover, LCH #2 has numerology 2 as its primary numerology and 0.5 ms as its maximum TTI. Further, LCH #3 has numerology 3 as its primary numerology and 1 ms as its maximum TTI. In addition, LCH #4 has numerology 1 as its primary numerology and 1 ms as its maximum TTI. As shown, LCH #2 has the highest priority with a logical channel priority of 1, LCH #1 has the second highest priority with a logical channel priority of 2, LCH #3 has the third highest priority with a logical channel priority of 3, and LCH #4 has the fourth highest priority (e.g., lowest priority) with a logical channel priority of 4.

TABLE 2

| LCH #1 (Priority 2) | LCH #2 (Priority 1) | LCH #3 (Priority 3) | LCH #4 (Priority 4) |
| --- | --- | --- | --- |
| Primary Numerology = 1 Max TTI = 1 ms | Primary Numerology = 2 Max TTI = 0.5 ms | Primary Numerology = 3 Max TTI = 1 ms | Primary Numerology = 1 Max TTI = 1 ms |

Using the information from Table 2 for one example, for an UL grant for numerology 1 and TTI length 1 ms, the logical channel priority order is: LCH #1, LCH #4, LCH #3. This is because LCH #1 and LCH #4 both have numerology 1 as the primary numerology and LCH #1 is before LCH #4 because LCH #1 has a channel priority of 2 which is higher than the channel priority of 4 for LCH #4, and LCH #3 is the only remaining channel that has a maximum TTI length greater than or equal to 1 ms. As a further example, for an UL grant for numerology 2 and TTI length 0.5 ms, the logical channel priority order is: LCH #2, LCH #1, LCH #3, LCH #4. This is because LCH #2 is the only logical channel with numerology 2 as the primary numerology, and all of LCH #1, LCH #3, and LCH #4 have a maximum TTI length greater than or equal to 0.5 ms and LCH #1, LCH #3, and LCH #4 are then ordered based on their channel priority. As another example, for an UL grant for numerology 1 and TTI length 0.5 ms, the logical channel priority order is: LCH #1, LCH #4, LCH #2, LCH #3. This is because LCH #1 and LCH #4 both have numerology 1 as the primary numerology and LCH #1 is before LCH #4 because LCH #1 has a channel priority of 2 which is higher than the channel priority of 4 for LCH #4, and both of LCH #2 and LCH #3 have a maximum TTI length greater than or equal to 0.5 ms and LCH #2 and LCH #3 are then ordered based on their channel priority. As a further example, for an UL grant for numerology 3 and TTI length 1 ms, the logical channel priority order is: LCH #3, LCH #1, LCH #4. This is because LCH #3 is the only logical channel with numerology 3 as the primary numerology, and both of LCH #1 and LCH #4 have a maximum TTI length greater than or equal to 1 ms and LCH #1 and LCH #4 are then ordered based on their channel priority.

Figure 6:
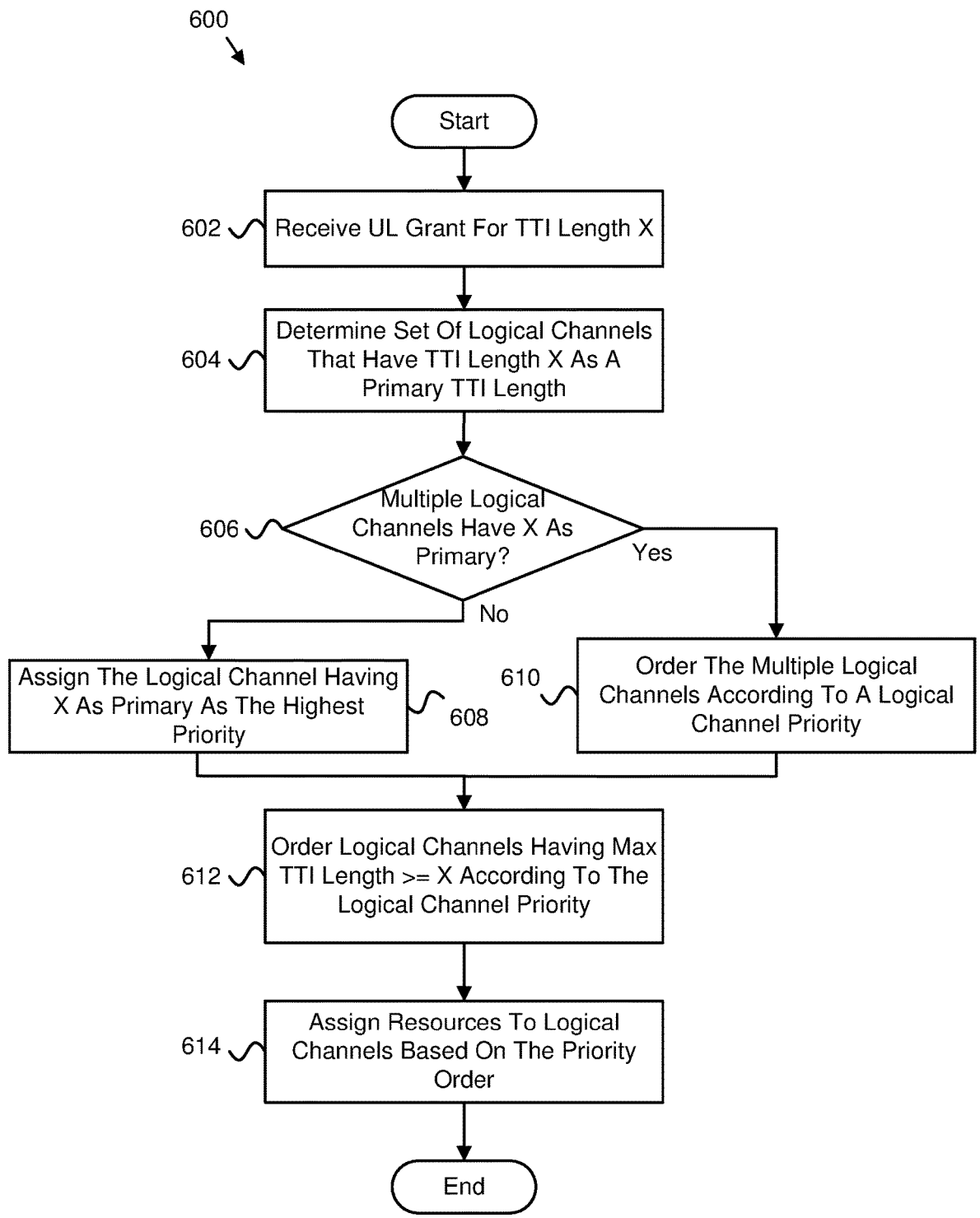
FIG. 6 is a schematic flow chart diagram illustrating a further embodiment of a method for determining a priority order based on an uplink transmission parameter.

FIG. 6 is a schematic flow chart diagram illustrating a further embodiment of a method 600 for determining a priority order based on an uplink transmission parameter. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the network (e.g. gNB) configures a preferred/primary TTI length and a maximum TTI length for each logical channel. The primary/preferred TTI length may be the TTI length best suited for transmission of data of a particular logical channel in order to meet the QoS requirement like latency. The maximum TTI length value allows a logical channel to use all the TTI lengths (regardless of the numerology) unless the TTI length cannot meet the delay requirement of the channel. Therefore, data of a logical channel may be transmitted using any TTI/numerology as long as the TTI length is equal or smaller than the configured maximum TTI length. In certain embodiments, the MAC needs to be aware only of the TTI length used for the uplink transmission when performing the logical channel to resource mapping (e.g., LCP procedure). In various embodiments, the only restriction of limiting some logical channels to certain resources corresponds to the delay requirement, which may equate with TTI length from the MAC point of view, regardless of the TTI length results from different numerologies (e.g., SCS scaling), or different number of OFDM symbols of one numerology. Accordingly, in certain embodiments, numerology may be transparent to the MAC. In some embodiments, the MAC prioritizes logical channels for which the configured preferred/primarily TTI is same as the indicated TTI length for the uplink transmission. If there are remaining resources available, logical channels for which the configured maximum TTI length is equal or larger than the indicated TTI length are considered for transmission.

Turning to the method 600, the method 600 includes receiving 602 an UL grant for a TTI length X. The method 600 also includes determining 604 a set of logical channels that have the TTI length X as indicated in the UL grant as a preferred/primary TTI length. The method 600 further determines a priority order among the logical channels of above determined set of logical channels based on a logical channel priority. Specifically, the method 600 determines 606 whether there are multiple logical channels that have TTI length X as the preferred/primary TTI length. In response to determining 606 that there is only one logical channel having TTI length X as the preferred/primary TTI length, the method 600 assigns 608 the one logical channel having TTI length X as the preferred/primary TTI length as the highest priority. In response to determining 606 that there are multiple logical channels having TTI length X as the preferred/primary TTI length, the method 600 orders 610 the multiple logical channels according to a configured logical channel priority (e.g., in decreasing priority order). Furthermore, the method 600 orders 612 logical channels having a maximum TTI length greater than or equal to X according to the logical channel priority (if there are resources remaining). The method 600 assigns 614 resources to individual logical channels based on the computed priority order of the logical channels using the LCP procedure. In some embodiments, the method 600 first assigns resources to the logical channels that have TTI length X as the preferred/primary TTI length based on the computed priority order 608 respectively 610 using the LCP procedure and subsequently assigns remaining resources (if any) to logical channels having a maximum TTI length greater than or equal to X based on the computed priority order 612.

Figure 7:
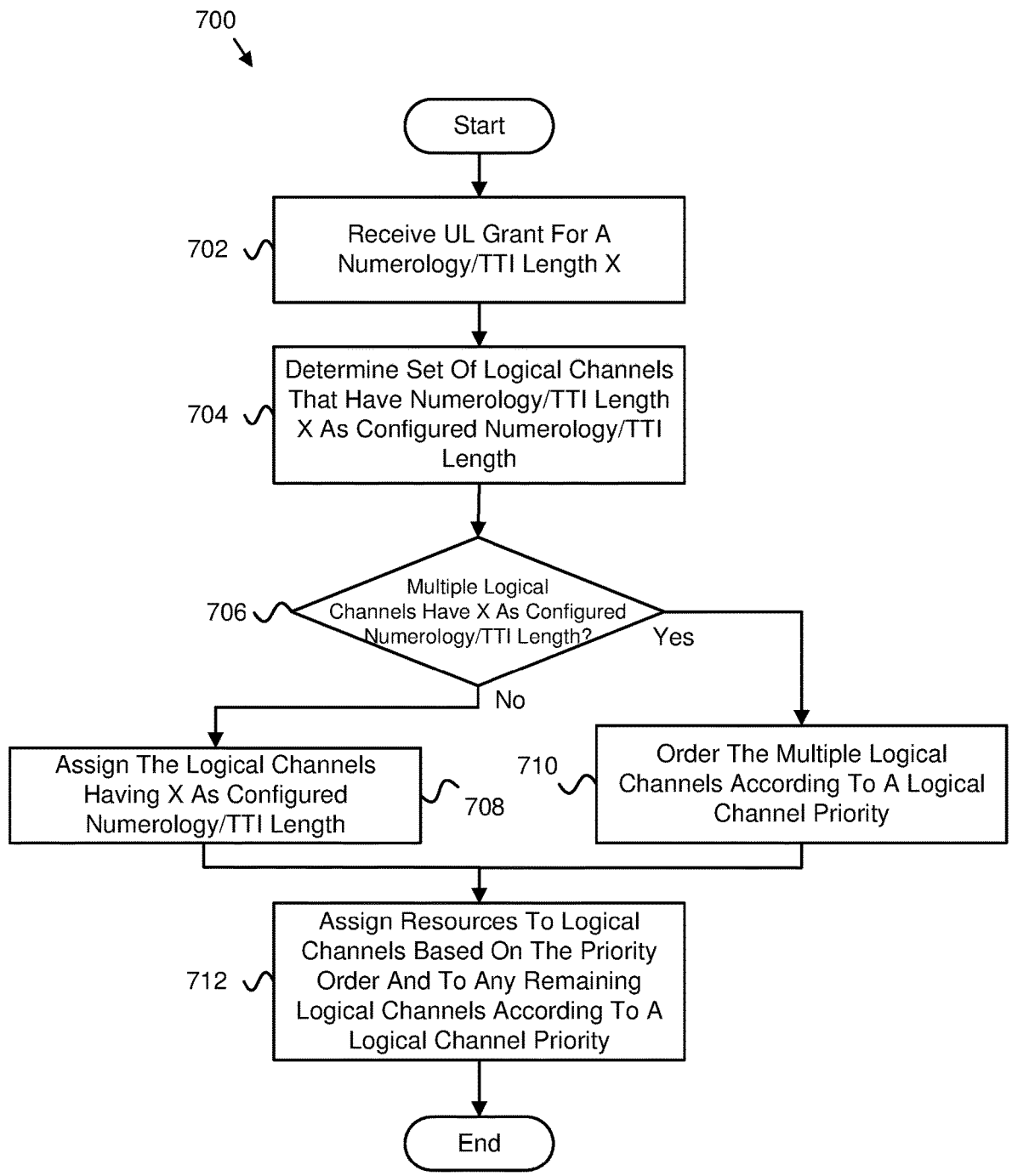
FIG. 7 is a schematic flow chart diagram illustrating yet another embodiment of a method for determining a priority order based on an uplink transmission parameter.

FIG. 7 is a schematic flow chart diagram illustrating yet another embodiment of a method 700 for determining a priority order based on an uplink transmission parameter. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In the embodiments described above in relation to FIGS. 4, 5, and 6 only a subset of logical channels are considered for LCP procedure (e.g., there is logical channel restriction for LCP procedures). For example, only those logical channels that have a configured primary/secondary numerology/TTI or maximum TTI that matches with the UL grant are considered during logical channel to resource mapping (e.g., during the LCP procedure). In some embodiments, all logical channels may be considered for LCP (e.g., there may be no restriction for logical channel to resource mapping). In such embodiments, each logical channel may be configured with a numerology/TTI. This configuration is the best suited numerology/TTI for transmission. During the LCP procedure the MAC entity prioritizes those logical channels having the configured numerology/TTI the same as the numerology/TTI used for the uplink transmission. For configurations in which there are multiple logical channels with a configured numerology/TTI the same as the indicated numerology/TTI, the logical channels are served in descending priority order (e.g., according to the logical channel priority). For the remaining resources (if any) all other logical channels are considered (e.g., in descending logical channel priority order).

Turning to the method 700, the method 700 includes receiving 702 an UL grant for a numerology/TTI length X. The method 700 also includes determining 704 a set of logical channels that have the numerology/TTI length X as the configured numerology/TTI length. The method 700 further determines a priority order among the logical channels of above determined set of logical channels based on a logical channel priority. Specifically, the method 700 determines 706 whether there are multiple logical channels that have the numerology/TTI length X as the configured numerology/TTI length. In response to determining 706 that there is only one logical channel having the numerology/TTI length X as the configured numerology/TTI length, the method 700 assigns 708 the one logical channel having the numerology/TTI length X as the configured numerology/TTI length as the highest priority. In response to determining 706 that there are multiple logical channels having the numerology/TTI length X as the configured numerology/TTI length, the method 700 orders 710 the multiple logical channels according to a configured logical channel priority (e.g., in decreasing priority order). The method 700 assigns 712 resources to individual logical channels based on the computed priority order of the logical channels using the LCP procedure and to any remaining logical channels according to a configured logical channel priority (e.g., in decreasing priority order) if remaining resources are available.

Certain embodiments described herein relate to the prioritization/restriction of a data radio bearer ("DRB") respectively to a corresponding dedicated traffic channel ("DTCH"). In various embodiments, the local channel to resource restrictions described herein may not be applied to specific logical channels (e.g., signaling radio bearers). For example, in certain embodiments, a remote unit 102 may be enabled to transmit a measurement report on any numerology/TTI. In some embodiments, it may be possible to configure certain logical channels for which numerology/TTI restrictions are not applied. Specifically, in certain embodiments, the network (e.g. gNB) may configure a logical channel to be mapped to any numerology/TTI length. In some embodiments, a specific codepoint may be defined within the RRC configuration (e.g., RRC configuration which configures the preferred/primary numerology/TTI) indicating that the logical channel considers any numerology/TTI as its preferred/primary numerology/TTI.

In some embodiments, MAC control elements may be prioritized over data from logical channels. In various embodiments, certain logical channels may be prioritized over MAC control elements. For example, data of logical channels which tolerate a very low latency may be prioritized over MAC control elements. In certain embodiments, the data from some logical channels may be prioritized over MAC control elements. For example, for a numerology which is used for URLLC communication (e.g., short symbol length) the data from logical channels may be prioritized over MAC control elements. In one embodiment, the data from logical channels having the numerology/TTI length used for the uplink transmission (as indicated by PHY to MAC) configured as a preferred/primary numerology/TTI may be prioritized over MAC control elements and data from other logical channels may not be prioritized over MAC control elements.

In certain embodiments, there are two types of scheduling modes: a dynamic resource scheduling mode, and a grant-free scheduling mode. In some embodiments, the dynamic resource scheduling mode is characterized in that the remote unit 102 will not autonomously perform uplink transmissions but will follow corresponding uplink scheduling assignments provided by the network (e.g., base unit 104, gNB). However, in some situations, uplink transmissions may be significantly delayed because the remote unit 102 has to first request and then receive a suitable uplink grant before performing the uplink transmissions. On the other hand, a grant-free scheduling mode may allow the remote unit 102 to immediately perform uplink transmissions in certain circumstances without having to request or receive a corresponding resource allocation from the network, thereby significantly reducing the delay. In various embodiments, the grant-free scheduling mode may only be used for certain logical channels (e.g., URLLC). In some embodiments, the network configures whether a logical channel is allowed to use the grant-free scheduling mode. In certain embodiments, the relative priority order as defined in TS36.321 section 5.4.3.1, which the MAC considers during logical channel prioritization, may be different depending on the scheduling mode. Specifically, data from logical channels which are using the grant-free scheduling mode may be prioritized over MAC control elements. In some embodiments, if a remote unit 102 is performing an uplink transmission according to a grant-free resource allocation, the MAC may use a different relative priority compared to a configuration in which an uplink resource is allocated by an UL grant (e.g., dynamically).

In certain embodiments, there may be a configured mapping between MAC control elements and numerologies/TTI. In various embodiments, the network may benefit from receiving MAC control elements as quickly as possible (e.g., for uplink scheduling keeping the reporting delay for buffer status report ("BSR") and power headroom report ("PHR") short may be important). In some embodiments, the remote unit 102 is scheduled for transmission of multiple transport blocks at the same time (e.g., in carrier aggregation). Accordingly, in such embodiments, the remote unit 102 may map MAC control elements to the transport block using the smallest TTI length respectively HARQ RTT. This may ensure that MAC control elements are received with the shortest delay so that the base unit 104 may use of the information carried in the MAC control elements as quickly as possible.

In one embodiment, a mapping between a MAC control element and allowed numerologies/TTI(s) may be performed. This mapping may be configured by network signaling or hard-coded in a specification. Thus, the remote unit 102 may use this configuration during the LCP procedure (e.g., when generating a transport block). In various embodiments, the mapping configuration enables the network to inhibit a remote unit 102 from mapping certain MAC control elements to specific numerologies/TTI (e.g., MAC control elements may not be mapped to a numerology used for delay-critical services like URLLC). In one embodiment, a mapping between a MAC control element and scheduling modes may be performed. This mapping may be configured by network signaling or hard-coded in a specification. Thus, the remote unit 102 may use this configuration during the LCP procedure (e.g., when generating a transport block). In various embodiments, the mapping configuration enables the network to inhibit a remote unit 102 from mapping certain MAC control elements uplink transmissions using a certain scheduling mode (e.g., MAC control elements may not be mapped to a transport block using the grant-free scheduling mode like for URLLC transmission using the grant-free scheduling mode).

In some embodiments, MAC control elements may be configured so that numerology/TTI restrictions are not applied. For example, the network may configure a MAC control element to be mapped to any numerology/TTI length. In certain embodiments, a specific codepoint may be defined within the RRC configuration (e.g., RRC configuration which configures the preferred/primary numerology/TTI) indicating that the logical channel identity identifying the MAC control element considers any numerology/TTI as its preferred/primary numerology/TTI. In various embodiments, a specification or elsewhere may indicate that MAC control elements may be transmitted using any numerology/TTI.

In some embodiments, an RRC inactive state indicates a power optimized state in which a remote unit 102 is allowed to transmit a certain amount of data (e.g., small data) without needing to transition to an RRC connected state. In certain embodiments, in the RRC inactive state there may be no logical channel to numerology/TTI restriction when the remote unit 102 performs LCP/UL data transmission. In such embodiments, each logical channel may use all the TTI lengths of any numerology. In some embodiments, when a remote unit 102 is directed into the inactive state by the network and (later on) intends to transmit on uplink, the network may have no knowledge about the remote unit's radio conditions and also may not be aware of the buffer status of the remote unit 102 (e.g., network doesn't know which data the remote unit 102 intends to transmit). In such embodiments, the base unit 104 may not be able to assign resources for a certain numerology/TTI which are suitable for the data the remote unit 102 intends to transmit. Also, in some embodiments, the remote unit 102 may transmit uplink data in a contention based manner (e.g., without prior reception of an uplink grant) and there may not be much benefit in restricting the LCH to numerology/TTI mapping. In various embodiments, upon being directed to an inactive mode, the MAC in the remote unit 102 may disable all previously configured restrictions (e.g., logical channel to numerology/TTI mapping).

In some embodiments, a PBR value may depend on whether a numerology/TTI length used for an uplink transmission is considered/not considered as the primary/preferred numerology/TTI of a logical channel. In embodiments in which the numerology/TTI used for uplink transmission is the preferred/primary numerology/TTI of a logical channel, the data transmission of this logical channel may be maximized (e.g., the MAC may allocate resources for all the data from that logical channel before meeting the PBR of the logical channel(s) for which the numerology is not the preferred/primary numerology/TTI). Table 3 is used to illustrate various examples of such embodiments.

TABLE 3

| LCH #1 (Priority 2) | LCH #2 (Priority 1) | LCH #3 (Priority 3) |
|---|---|---|
| Primary Numerology = 1 | Primary Numerology = 2 | Primary Numerology = 3 |
| Secondary Numerology = 3 | Secondary Numerology = 1 | Secondary Numerology = 1 |
|  | Secondary Numerology = 3 |  |

In one example, as described in relation to FIG. 4, the priority order of the logical channels for an UL grant using numerology 1 may be: LCH #1, LCH #2, LCH #3. In certain embodiments, the MAC may allocate all the data that is available for transmission from LCH #1, before allocating any (remaining) resources to LCH #2, LCH #3. The behavior according to this aspect may be implemented by defining that the PBR of LCH #1 is indicated as infinity (e.g., the MAC may allocate resources for all the data that is available for transmission on that logical channel before meeting the PBR of the lower priority logical channel(s)). In some embodiments, this behavior may be implemented when performing the LCP procedure first for all the logical channels having the indicated numerology (in UL grant) as primary/preferred numerology and then subsequently performing the LCP procedure for all the logical channels having the indicated numerology as a secondary numerology.

Figure 8:
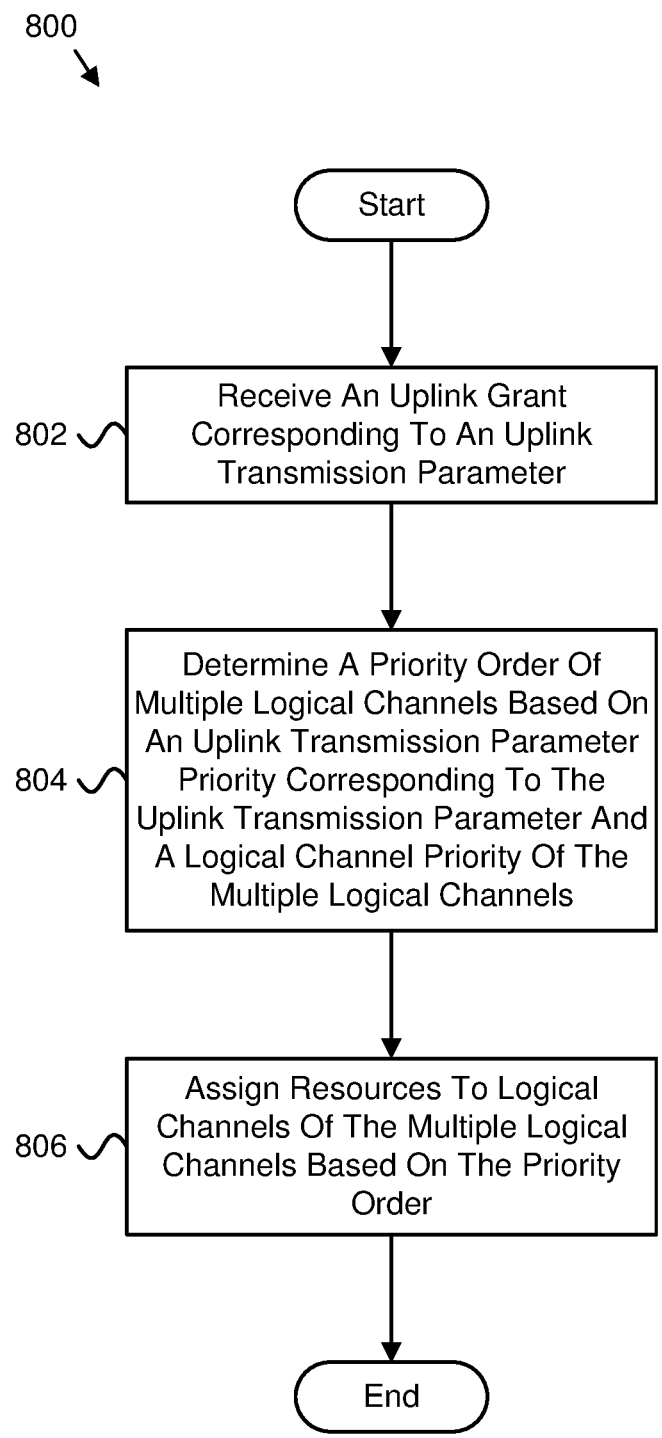
FIG. 8 is a schematic flow chart diagram illustrating a further embodiment of a method for determining a priority order based on an uplink transmission parameter.

FIG. 8 is a schematic flow chart diagram illustrating a further embodiment of a method 800 for determining a priority order based on an uplink transmission parameter. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 an uplink grant corresponding to an uplink transmission parameter (e.g., numerology, TTI length, etc.). The method 800 also includes determining 804 a priority order of multiple logical channels based on an uplink transmission parameter priority corresponding to the uplink transmission parameter and a logical channel priority of the multiple logical channels. The method 800 includes assigning 806 resources to logical channels of the plurality of logical channels based on the priority order.

In one embodiment, the uplink transmission parameter includes an indication of a numerology. In a further embodiment, the numerology includes a subcarrier spacing, an orthogonal frequency-division multiplexing symbol duration, a cyclic prefix duration, a number of symbols per scheduling interval, or some combination thereof. In certain embodiments, the uplink transmission parameter includes an indication of a transmission time interval. In various embodiments, each logical channel of the multiple logical channels includes a primary uplink transmission parameter and one or more secondary uplink transmission parameters. In some embodiments, a primary uplink transmission parameter has a first priority, each of one or more secondary uplink transmission parameters has a respective priority from a set of one or more second priorities, the first priority is greater than each priority of the set of one or more second priorities, and each priority of the set of one or more priorities is ranked relative to the other priorities of the set of one or more priorities.

In some embodiments, the primary uplink transmission parameter and the one or more secondary uplink transmission parameter each include a numerology, a transmission time interval length, or some combination thereof. In one embodiment, the processor determines the priority order of the multiple logical channels based on the uplink transmission parameter priority corresponding to the uplink transmission parameter and the logical channel priority of the multiple logical channels by: selecting a first set of logical channels of the multiple logical channels in response to the primary uplink transmission parameter of logical channels of the first set of logical channels matching the uplink transmission parameter and ordering the logical channels of the first set of logical channels according to a logical channel priority of each logical channel of the first set of logical channels; and for each secondary uplink transmission parameter of the one or more secondary uplink transmission parameters, selecting a second set of logical channels of the multiple logical channels in response to the respective secondary uplink transmission parameter of logical channels of the second set of logical channels matching the uplink transmission parameter and ordering the logical channels of the second set of logical channels according to a logical channel priority of each logical channel of the second set of logical channels.

In certain embodiments, ordering the logical channels of the first set of logical channels includes ordering the logical channels of the first set of logical channels in descending priority order, and ordering the logical channels of the second set of logical channels includes ordering the logical channels of the second set of logical channels in descending priority order. In various embodiments, the uplink transmission parameter priority includes a first priority corresponding to a first uplink transmission parameter and a second priority corresponding to a second uplink transmission parameter. In some embodiments, the first uplink transmission parameter includes a primary numerology and the second uplink transmission parameter includes a maximum transmission time interval length.

In one embodiment, the first uplink transmission parameter includes a primary transmission time interval length and the second uplink transmission parameter comprises a maximum transmission time interval length. In certain embodiments, the uplink transmission parameter priority is disregarded during operation in an inactive mode. In various embodiments, the processor determines the priority order of the multiple logical channels based on the uplink transmission parameter priority corresponding to the uplink transmission parameter and the logical channel priority of the multiple logical channels by: selecting a first set of logical channels of the multiple logical channels in response to a primary uplink transmission parameter of logical channels of the first set of logical channels matching the uplink transmission parameter and ordering the logical channels of the first set of logical channels according to a logical channel priority of each logical channel of the first set of logical channels; and selecting a second set of logical channels of the multiple logical channels in response to a secondary uplink transmission parameter of logical channels of the second set of logical channels matching the uplink transmission parameter and ordering the logical channels of the second set of logical channels according to a logical channel priority of each logical channel of the second set of logical channels.

In one embodiment, logical channels of the first set of logical channels are prioritized over a medium access control control element. In certain embodiments, ordering the logical channels of the first set of logical channels includes ordering the logical channels of the first set of logical channels in descending priority order, and ordering the logical channels of the second set of logical channels includes ordering the logical channels of the second set of logical channels in descending priority order. In various embodiments, each logical channel of the multiple logical channels includes a primary uplink transmission parameter. In some embodiments, the primary uplink transmission parameter includes a numerology, a transmission time interval length, or some combination thereof. In one embodiment, the processor determines the priority order of the multiple logical channels based on the uplink transmission parameter priority corresponding to the uplink transmission parameter and the logical channel priority of the multiple logical channels by: selecting a first set of logical channels of the multiple logical channels in response to a primary uplink transmission parameter of logical channels of the first set of logical channels matching the uplink transmission parameter and ordering the logical channels of the first set of logical channels according to a logical channel priority of each logical channel of the first set of logical channels; and selecting a second set of logical channels of the multiple logical channels in response to a primary uplink transmission parameter of logical channels of the second set of logical channels not matching the uplink transmission parameter and ordering the logical channels of the second set of logical channels according to a logical channel priority of each logical channel of the second set of logical channels.

In one embodiment, ordering the logical channels of the first set of logical channels includes ordering the logical channels of the first set of logical channels in descending priority order, and ordering the logical channels of the second set of logical channels includes ordering the logical channels of the second set of logical channels in descending priority order. In certain embodiments, a logical channel of the multiple logical channels includes a primary uplink transmission parameter that indicates that the logical channel considers any numerology or any transmission time interval length as the primary uplink transmission parameter. In some embodiments, a logical channel of the multiple logical channels includes a primary uplink transmission parameter that is prioritized over medium access control control elements. In various embodiments, the processor associates the uplink transmission parameter with a medium access control control element. In one embodiment, a medium access control control element includes a primary uplink transmission parameter that indicates that a medium access control control element considers any numerology or any transmission time interval length as the primary uplink transmission parameter. In certain embodiments, the processor determines a prioritized bit rate based on the uplink transmission parameter priority.

Figure 9:
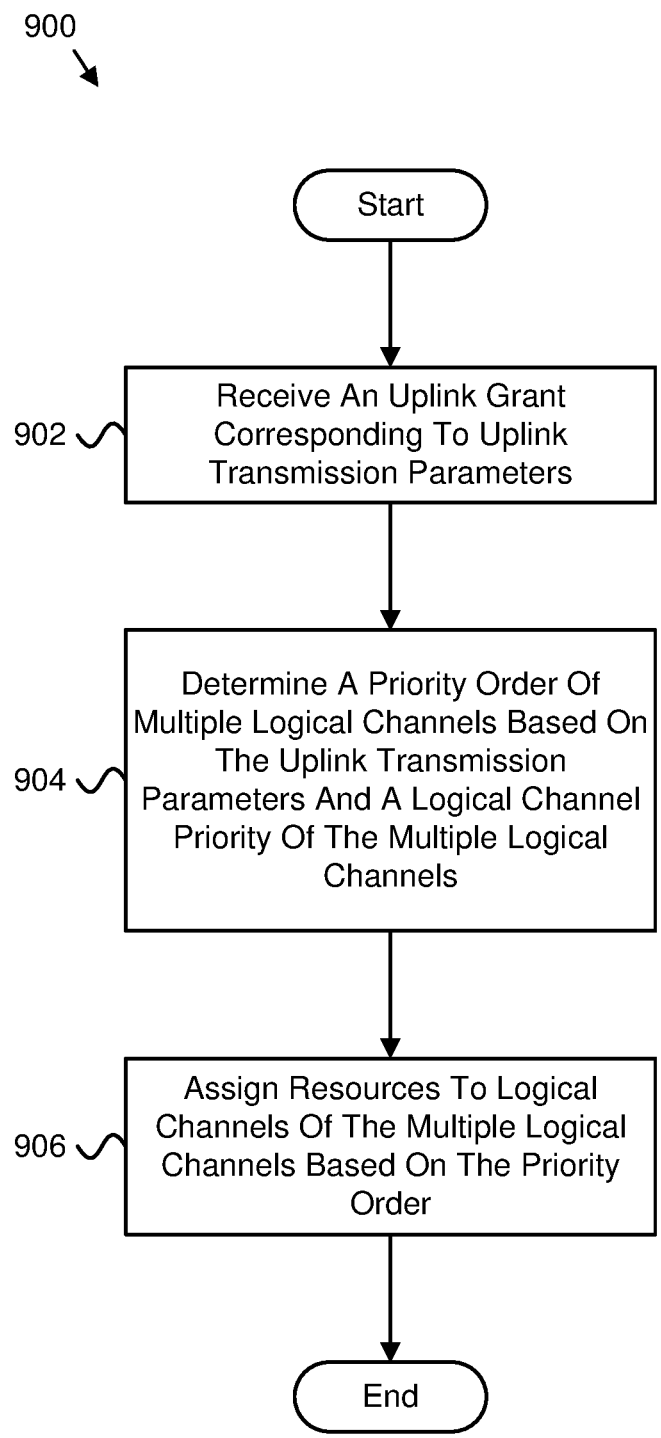
FIG. 9 is a schematic flow chart diagram illustrating one embodiment of a method for determining a priority order based on uplink transmission parameters.

In various embodiments, such as in FIG. 9, a priority order may be determined based on multiple uplink transmission parameters. In one such embodiment, a base unit 104 may configure a preferred/primary numerology or a set of allowed numerologies and a maximum TTI length for each logical channel. In some embodiments, the primary/preferred numerology is a numerology best suited for transmission of data of the logical channel in order to meet a QoS requirement (e.g., reliability). In certain embodiments, if a set of numerologies is configured for a LCH, "allowed" numerologies may refer to numerologies which are suited for transmission of data of the logical channel in order to meet the QoS requirement (e.g., reliability). In various embodiments, a maximum TTI length value enables a logical channel to use all TTI lengths unless the TTI length cannot meet a delay requirement of the logical channel. In one embodiment, data of a logical channel may be transmitted as long as the TTI length is equal to or smaller a configured maximum TTI length. In some embodiments, TTI length, which may refer to a schedulable unit of time from a MAC point of view, may depend not only on a used numerology (e.g., subcarrier spacing "SCS"), but also on a number of used OFDM symbols. In certain embodiments, a MAC layer is aware of a numerology used for an uplink transmission and the TTI length. In such embodiments, based on a numerology and TTI length, as indicated by a physical layer ("PHY") to a MAC upon reception of an uplink grant, a logical channel to resource mapping (e.g., LCP procedure) may be performed. In various embodiments, in response to an uplink grant being received, a MAC entity considers only those logical channels that have a configured (e.g., allowed) numerology and maximum TTI that matches with the UL grant during logical channel to resource mapping (e.g., during the LCP procedure). In such embodiments, this may facilitate reliability as well as latency requirements of the logical channels to be met. In some embodiments, an order in which the considered LCHs are served is based on a configured logical channel priority.

In various embodiments, a base unit 104 may configure a set of allowed numerologies and a maximum TTI length for each configured "allowed" numerology for a logical channel. In such embodiments, the "allowed" numerologies may define the numerologies which are suited for transmission of data of the logical channel in order to meet a QoS requirement (e.g., reliability). In some embodiments, a maximum TTI length value enables a logical channel to use all the TTI lengths unless the TTI length cannot meet the delay requirement of the logical channel. In certain embodiments, data of a logical channel may be transmitted as long as a TTI length is equal to or smaller than a configured maximum TTI length. Since different numerologies may have different OFDM symbol length and also different HARQ RTT(s), a maximum TTI length may depend on a used numerology. In various embodiments, a MAC layer may be aware of a numerology used for an uplink transmission and a TTI length. Based on the numerology and TTI length, as indicated by the PHY to the MAC upon reception of an uplink grant, a logical channel to resource mapping (e.g., LCP procedure) may be performed. In some embodiments, in response to an uplink grant being received, a MAC entity may consider only logical channels that have a configured (e.g., allowed) numerology and a corresponding maximum TTI length that matches with the UL grant during logical channel to resource mapping (e.g., during the LCP procedure). This may facilitate reliability as well as latency requirements of a logical channels to be met. In one embodiment, an order in which considered LCHs are served may be based on a configured logical channel priority.

In some embodiments, a same TTI may result from different numerologies. In certain embodiments, in response to having numerology specific power control settings/parameters (e.g., Po, alpha), a TB may contain data of a LCH using a numerology which is not suited for transmission, if only TTI length is considered during LCP (e.g., logical channel restriction). In various embodiments, because an UL grant for a short TTI length may be used for eMBB, (e.g., power control settings according to eMBB) a MAC may multiplex URLLC data on the TB (since TTI length is matching) even though the numerology may not be suited for URLLC (e.g., reliability requirement for URLLC may not be met). Therefore, in some embodiments, numerology and TTI length may be considered for LCP procedure.

In various embodiments, a used numerology for an uplink transmission may be indicated to a MAC layer by an index (e.g., PHY doesn't indicate a full set of parameters associated with a numerology like SCS, CP length). In such embodiments, the index may refer to a list describing used numerologies and their parameters (e.g., subcarrier spacing, CP length, etc.). In certain embodiments, numerologies in a list may be ordered according to reliability requirements (e.g., block error ratio "BLER"). For example, a numerology referenced by index 1 may fulfill the most stringent reliability requirements (e.g., lowest BLER). In some embodiments, a base unit 104 may configure a maximum numerology and a maximum TTI length for each logical channel. In various embodiments, a MAC layer may be aware of the numerology (e.g., index) used for an uplink transmission and the TTI length. Based on the numerology and TTI length, as indicated by the PHY to the MAC upon reception of an uplink grant, a logical channel to resource mapping (e.g., LCP procedure) may be performed. In some embodiments, in response to an uplink grant being received, a MAC may consider only those logical channels that have a configured maximum numerology and maximum TTI that matches with the UL grant during logical channel to resource mapping (e.g., during the LCP procedure). In various embodiments, only those logical channels are "allowed" for LCP for which the configured maximum numerology value is higher than or equal to the numerology index value indicated to MAC and for which the configured maximum TTI length is higher than or equal to the TTI length indicated to MAC. In such embodiments, this may facilitate that reliability as well as latency requirements of the logical channels are met. In one embodiment, an order in which considered LCHs are served is based on a configured logical channel priority.

In some embodiments, each LCH may be configured with a set of "allowed" numerologies and optionally also with a maximum TTI length. In various embodiments, multiple SR resources may be configured independently (e.g., SR resources may be configured per numerology). In certain embodiments, having multiple independent SR resources may be used to convey additional information within a scheduling request. For example, based on the SR resource used by a remote unit 102, a base unit 104 may determine a numerology requested by a remote unit 102 for a corresponding UL transmission. In some embodiments, for cases in which an LCH is configured with more than one numerology, a remote unit 102 may select a SR resource corresponding to a first configured numerology (e.g., highest priority numerology). In various embodiments, if a BSR is triggered by data arrival of a LCH and a remote unit 102 has no UL resource for transmission of BSR, the remote unit 102 may select an SR resource according to a first numerology configured for this LCH (e.g., a highest priority numerology). In some embodiments, a remote unit 102 may select a nearest SR resource from a set SR resources corresponding to configured resources.

In certain embodiments, in response to a MAC entity being requested to transmit multiple MAC protocol data units ("PDUs") in one TTI, the order in which grants are processed may be left up to a remote unit 102 implementation. In other embodiments that support multiple numerologies and corresponding logical channel restrictions, a remote unit 102 behavior may be predefined (e.g., an order in which TBs are generated). In such embodiments, depending on the order in which a remote unit 102 processes UL grants in circumstances in which multiple UL grants have been received simultaneously, the content of corresponding TBs may be different.

For example, there may be two LCHs as listed in Table 4.

TABLE 4

| LCH#1 (Priority 1) | LCH#2 (Priority 2) |
|---|---|
| "Primary" Numerology = Numerology 1 "Secondary" Numerology = Numerology 2 | "Primary" Numerology = Numerology 1 |
| Max TTI = 0.5 ms | Max TTI = 1 ms |

In various embodiments, a remote unit 102 may receive two UL grants simultaneously. In such embodiments, a first UL grant may indicate numerology 1 and TTI=0.5 ms and a second UL grant may indicate numerology 2 and TTI=0.5 ms. In such an embodiment, the content of the TB may be: the remote unit 102 processes the second UL grant followed by the first UL grant. Accordingly, a first TB may use numerology 2 of LCH #1 (e.g., the size of the first TB fits the amount of data for LCH #1) and a second TB may use numerology 1 of LCH #2 (e.g., the size of the second TB fits the amount of data for LCH #2). Further, in such an embodiment, the content of the TB may be: the remote unit 102 processes the first UL grant followed by the second UL grant. Accordingly, a first TB may use numerology 1 of LCH #1 and LCH #2 (e.g., the size of the first TB does not fit the amount of data for LCH #1) and a second TB may use numerology 2 of LCH #1 plus padding (e.g., the size of the second TB is too large for the amount of data for LCH #1).

In some embodiments, the processing order may result in poor efficiency (e.g., padding is transmitted for TB2). Therefore, due to the logical channel restriction, processing order may make a difference.

In certain embodiments, it may be beneficial for a base unit 104 to know a remote unit 102 behavior and the content of the TBs (e.g., the base unit 104 may update its buffer status information based on a predicated remote unit 102 behavior). In various embodiments, a rule may be defined which specifies the remote unit 102 behavior (e.g., an order in which a remote unit 102 processes UL grants). In one embodiment, a remote unit 102 may process first UL grants which consider a least number of logical channels (e.g., first process UL grant for numerology 2 in the example above). In some embodiments, a remote unit 102 may determine an order according to some predefined numerology priority order. In various embodiments, a component carrier order may be predefined or signalled to a remote unit 102.

FIG. 9 is a schematic flow chart diagram illustrating one embodiment of a method 900 for determining a priority order based on uplink transmission parameters. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 an uplink grant corresponding uplink transmission parameters including an indication of a numerology and a transmission time interval length. The method 900 also includes determining 904 a priority order of multiple logical channels based on the uplink transmission parameters and a logical channel priority of the multiple logical channels. The method 900 includes assigning 906 resources to logical channels of the multiple logical channels based on the priority order.

In one embodiment, the numerology includes a subcarrier spacing, an orthogonal frequency-division multiplexing symbol duration, a cyclic prefix duration, or some combination thereof. In a further embodiment, the method 900 includes determining the priority order of the multiple logical channels based on the uplink transmission parameters and the logical channel priority of the multiple logical channels by: selecting a set of logical channels of the multiple logical channels in response to a numerology parameter of each logical channel of the set of logical channels including the numerology and a maximum transmission time interval length of each logical channel of the set of logical channels being less than or equal to the transmission time interval length; and ordering the logical channels of the set of logical channels according to a logical channel priority of each logical channel of the set of logical channels. In certain embodiments, ordering the logical channels of the set of logical channels includes ordering the logical channels of the set of logical channels in descending priority order. In various embodiments, the numerology parameter includes one or more numerologies. In some embodiments, logical channels of the set of logical channels are prioritized over a medium access control control element.

In some embodiments, the indication of the numerology includes an index corresponding to the numerology. In one embodiment, each logical channel of the multiple logical channels is configured with a set of numerologies allowed by the respective logical channel and a maximum transmission time interval length.

In certain embodiments, each logical channel of the multiple logical channels is configured with a maximum numerology allowed by the respective logical channel and a maximum transmission time interval length. In various embodiments, the method 900 includes determining the priority order of the multiple logical channels based on the uplink transmission parameters and the logical channel priority of the multiple logical channels by: selecting a set of logical channels of the multiple logical channels in response to a maximum numerology of each logical channel of the set of logical channels being less or equal to the numerology and a maximum transmission time interval length of each logical channel of the set of logical channels being less than or equal to the transmission time interval length; and ordering the logical channels of the set of logical channels according to a logical channel priority of each logical channel of the set of logical channels. In some embodiments, the method 900 includes selecting a scheduling request resource for transmission, and the scheduling request resource corresponds to a numerology being requested for uplink transmission.

In one embodiment, the method 900 includes selecting the scheduling request resource according to a first numerology of a set of configured numerologies of a logical channel of the multiple logical channels for which a buffer status report is triggered due to data becoming available for transmission. In certain embodiments, the method 900 includes receiving multiple uplink grants and determining an order for processing the multiple uplink grants based on a number of logical channels of the multiple logical channels configured with a numerology corresponding to a respective uplink grant of the multiple uplink grants. In various embodiments, the method 900 includes receiving multiple uplink grants and determining an order for processing the multiple uplink grants based on a predefined numerology priority order. In one embodiment, the method 900 includes receiving multiple uplink grants and determining an order for processing the multiple uplink grants based on a predefined order, a signaled order, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive information indicating uplink transmission parameters for a medium access control (MAC) layer, wherein the uplink transmission parameters correspond to an uplink grant, the uplink transmission parameters comprise an indication of a numerology and an uplink transmission duration, and the numerology comprises a subcarrier spacing; and
assign resources allocated by the uplink grant to at least one MAC control element (MAC-CE) based on the uplink transmission parameters, wherein each respective MAC-CE of a set of MAC-CE is configured with a set of numerologies allowed by the respective MAC-CE, a set of uplink transmission durations allowed by the respective MAC-CE, and information indicating whether the respective MAC-CE is allowed to be transmitted on a configured grant.

2. The UE of claim 1, wherein the numerology comprises an orthogonal frequency-division multiplexing symbol duration, a cyclic prefix duration, or some combination thereof.

3. The UE of claim 1, wherein the at least one processor is configured to cause the UE to assign the resources allocated by the uplink grant to the at least one MAC-CE based on the uplink transmission parameters by:
selecting the at one MAC-CE from the set of MAC-CEs of the at least one MAC-CE in response to a respective numerology parameter of each respective MAC-CE of the set of MAC-CEs including a respective numerology and a respective uplink transmission duration parameter of each respective MAC-CE of the set of MAC-CEs including the respective uplink transmission duration; and assigning resources to the selected at least one MAC-CE.

4. The UE of claim 3, wherein the respective numerology parameter comprises one or more numerologies.

5. The UE of claim 1, wherein the indication of the numerology comprises an index corresponding to the numerology.

6. A method performed by a user equipment (UE), the method comprising:

receiving information indicating uplink transmission parameters for a medium access control (MAC) layer, wherein the uplink transmission parameters correspond to an uplink grant, the uplink transmission parameters comprise an indication of a numerology and an uplink transmission duration, and the numerology comprises a subcarrier spacing; and assigning resources allocated by the uplink grant to at least one MAC control element (MAC-CE) based on the uplink transmission parameters, wherein each respective MAC-CE of a set of MAC-CE is configured with a set of numerologies allowed by the respective MAC-CE, a set of uplink transmission durations allowed by the respective MAC-CE, and information indicating whether the respective MAC-CE is allowed to be transmitted on a configured grant.

7. The method of claim 6, wherein the numerology comprises an orthogonal frequency-division multiplexing symbol duration, a cyclic prefix duration, or some combination thereof.

8. The method of claim 6, wherein assigning the resources allocated by the uplink grant to the at least one MAC-CE based on the uplink transmission parameters comprises:

selecting the at one MAC-CE from the set of MAC-CEs of the at least one MAC-CE in response to a respective numerology parameter of each respective MAC-CE of the set of MAC-CEs including a respective numerology and a respective uplink transmission duration parameter of each respective MAC-CE of the set of MAC-CEs including the respective uplink transmission duration; and assigning resources to the selected MAC-CE.

9. The method of claim 8, wherein the respective numerology parameter comprises one or more numerologies.

10. The method of claim 6, wherein the indication of the numerology comprises an index corresponding to the numerology.

11. A base station, comprising:
at least one memory; and
at least one processor coupled with the at least one memory and configured to cause the base station to:
transmit information indicating of uplink transmission parameters for a medium access control (MAC) layer, wherein the uplink transmission parameters correspond to an uplink grant, the uplink transmission parameters comprise an indication of a numerology and an uplink transmission duration, the numerology comprises a subcarrier spacing, resources allocated by the uplink grant are assigned to at least one MAC control element (MAC-CE) based on the uplink transmission parameters, and each respective MAC-CE of a set of MAC-CE is configured with a set of numerologies allowed by the respective MAC-CE, a set of uplink transmission durations allowed by the respective MAC-CE, and information indicating whether the respective MAC-CE is allowed to be transmitted on a configured grant.

12. The base station of claim 11, wherein the numerology comprises an orthogonal frequency-division multiplexing symbol duration, a cyclic prefix duration, or some combination thereof.

13. The base station of claim 11, wherein the resources allocated by the uplink grant are assigned to the at least one MAC-CE based on the uplink transmission parameters by:

the at one MAC-CE being selected from the set of MAC-CEs of the at least one MAC-CE in response to a respective numerology parameter of each respective MAC-CE of the set of MAC-CEs including a respective numerology and a respective uplink transmission duration parameter of each respective MAC-CE of the set of MAC-CEs including the respective uplink transmission duration; and resources to the selected at least one MAC-CE being assigned.

14. The base station of claim 13, wherein the respective numerology parameter comprises one or more numerologies.

15. The base station of claim 11, wherein the indication of the numerology comprises an index corresponding to the numerology.

16. A processor for wireless communication, comprising:
at least one controller coupled with at least one memory and configured to cause the processor to:
receive information indicating uplink transmission parameters for a medium access control (MAC) layer, wherein the uplink transmission parameters correspond to an uplink grant, the uplink transmission parameters comprise an indication of a numerology and an uplink transmission duration, and the numerology comprises a subcarrier spacing; and assign resources allocated by the uplink grant to at least one MAC control element (MAC-CE) based on the uplink transmission parameters, wherein each respective MAC-CE of a set of MAC-CE is configured with a set of numerologies allowed by the respective MAC-CE, a set of uplink transmission durations allowed by the respective MAC-CE, and information indicating whether the respective MAC-CE is allowed to be transmitted on a configured grant.

17. The processor of claim 16, wherein the numerology comprises an orthogonal frequency-division multiplexing symbol duration, a cyclic prefix duration, or some combination thereof.

18. The processor of claim 16, wherein the at least one controller is configured to cause the processor to assign the resources allocated by the uplink grant to the at least one MAC-CE based on the uplink transmission parameters by:

selecting the at one MAC-CE from the set of MAC-CEs of the at least one MAC-CE in response to a respective numerology parameter of each respective MAC-CE of the set of MAC-CEs including a respective numerology and a respective uplink transmission duration parameter of each respective MAC-CE of the set of MAC-CEs including the respective uplink transmission duration; and assigning resources to the selected at least one MAC-CE.

19. The processor of claim 18, wherein the respective numerology parameter comprises one or more numerologies.

20. The processor of claim 16, wherein the indication of the numerology comprises an index corresponding to the numerology.

\* \* \* \* \*